UNITED STATES PATENT OFFICE.

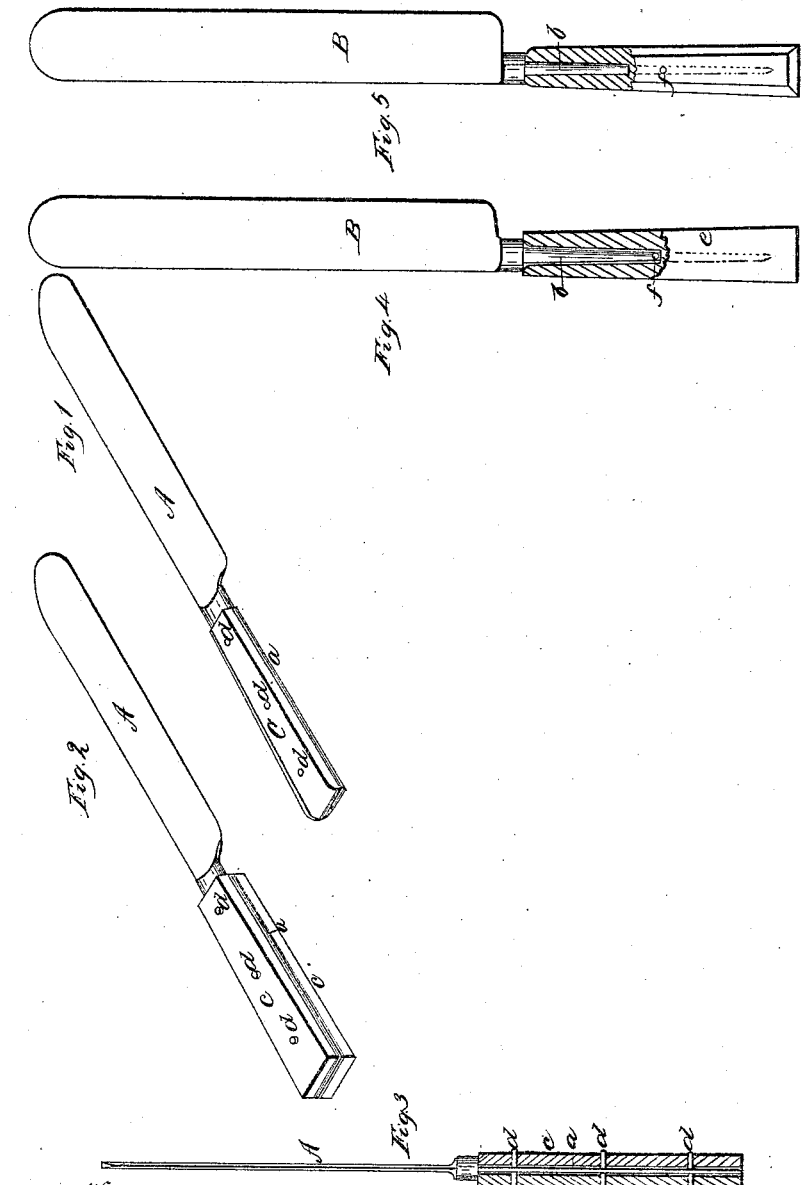

MATTHEW CHAPMAN, OF GREENFIELD, MASSACHUSETTS, ASSIGNOR TO J. RUSSELL MANUFACTURING CO., OF SAME PLACE.

ATTACHING HANDLES TO CUTLERY.

Specification of Letters Patent No. 22,527, dated January 4, 1859.

*To all whom it may concern:*

Be it known that I, MATTHEW CHAPMAN, of Greenfield, in the county of Franklin and State of Massachusetts, have invented a new and useful improvement in manufacturing and attaching handles to cutlery and all implements to which small handles are attached; and I do hereby declare that the following is a full, clear, and exact description of the same, reference being had to the annexed drawings, making a part of this specification, in which—

Figure 1, is a perspective view of a knife having a handle formed and attached to a flat tang according to my invention. Fig. 2, is a view of the same having a handle attached to it but in an unfinished state. Fig. 3, is a view of the same, having an unfinished handle bisected longitudinally. Fig. 4, is a view of a knife having a handle attached in an unfinished state to a round tang, a portion of the handle being bisected or broken away. Fig. 5, is a view of the same, having a finished handle attached to a round tang.

Similar letters of reference indicate corresponding parts in the several figures.

This invention consists in forming the handles by pressure, by means of dies and from the rough, when secured on the tang of the implement, whereby the handles are not only properly formed or shaped, but, are also by the same dies and at the same operation, riveted to the tangs and firmly closed around or on them. This invention is applicable to all handles the material of which is capable of being compressed.

To enable those skilled in the art to fully understand and construct my invention I will proceed to describe it.

A, Figs. 1, 2 and 3 represents a knife which has a flat tang $a$, and B, Figs. 4 and 5 is a knife which has a round tang $b$. The handle C, of the knife A, is formed of two pieces of wood $c$, $c$, or other suitable material capable of being compressed. The pieces $c$, $c$, are sawed roughly in approximate form to the handle to be formed, and the two pieces are placed one at each side of the tang $a$, and rivets $d$, are placed through the pieces $c$, $c$, and tang $a$, the ends of the rivets projecting a short distance from each side of the pieces as shown clearly in Fig. 3. The handle when thus fitted in a rough state on the tang $a$, is placed between heated dies and compressed into proper form as shown at C, Fig. 1, the rivets $d$, being properly headed by the same pressure that forms the handle, and the handle also closed very tightly on the tang $a$, forming a very compact solid handle. By heating the dies a luster is given the wood and by a slight application of the handle to a buff wheel a good finish is obtained. The handle B, is also sawed out in a rough form approximating of course to that of a finished handle. As this handle is fitted on a round tang $b$, the rough block $e$, Fig. 4, is a single piece of wood bored at one end to receive the tang $b$, and a wire or rivet $f$, is fitted through the block and tang. The block $e$, is then placed between heated dies as the one previously described and compressed into proper form as shown in Fig. 5, the rivet $f$, being headed by the pressure of the dies.

This invention has been practically tested and has been found to answer a good purpose. Much labor is saved by its adoption. Hitherto a handle passed through various hands in order to be completed and when finished it would not compare favorably with one formed according to the within described invention, neither as regard looks nor durability. One great advantage of this invention is the securing of the handle on the tang, which is accomplished by the pressure to which the handle is subjected while being formed by the dies. The rivets are employed because they occasion but little extra work and render the handle seemingly more secure and more salable, but in consequence of the handle being compressed on the tang it is closed very firmly around them and all looseness or play which occurs frequently with handles constructed and attached in the ordinary way, is avoided.

I would remark that the dies used for compressing the handles may be of ordinary or any proper construction and arranged in the usual way, there being nothing peculiar in the dies nor in their operation in order to effect the desired result. I would also remark that wood forms an excellent material for handles applied according to the within described invention, for the wood when compressed and molded into proper form, adheres in consequence of its rigidity very tenaciously to the tangs. I design to use the hardest kinds of woods, or those having a very compact grain, as coca, ebony, and the like. The most rigid kinds of wood may be compressed and molded into the desired form when subjected to a requisite degree of pressure. Wood has been bent by being "upset" under heavy pressure showing that the fiber may be completely displaced longitudinally, and compressed into a considerably smaller space at one side than it originally occupied, see Blanchard's patent for bending wood dated December 18th, 1849.

I do not claim making handles for cutlery by compressing the same into the proper form by means of dies, for this has been previously done, horn and other substances having been thus compressed for similar and analogous purposes, but, having thus described my invention,

What I claim as new and desire to secure by Letters Patent, is,

Placing the handles in the rough on the tangs of the implements, with or without the rivets and compressing the same, while on the tangs, into proper form by means of dies, substantially as and for the purpose set forth.

MATTHEW CHAPMAN.

Witnesses:
FRANK B. RUSSELL,
A. MADDEN.